(12) United States Patent
Batts et al.

(10) Patent No.: US 6,214,601 B1
(45) Date of Patent: *Apr. 10, 2001

(54) METHOD FOR INHIBITING THE GROWTH OF MICROORGANISMS IN AN AQUEOUS MEDIUM

(75) Inventors: Gregory N. Batts, Bushey; Christopher P. Moore, Rayners Lane; Karen Leeming, Harrow, all of (GB)

(73) Assignee: Eastman Kodak Company, Rochester, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/883,097

(22) Filed: Jun. 26, 1997

(30) Foreign Application Priority Data

Jul. 20, 1996 (GB) ................................ 9615262

(51) Int. Cl.⁷ .................................... C12N 1/02
(52) U.S. Cl. .................. 435/243; 435/259; 435/261; 422/1; 422/6; 206/205
(58) Field of Search ................. 435/243, 259, 435/261; 422/1, 6; 206/205

(56) References Cited

U.S. PATENT DOCUMENTS

| | | | |
|---|---|---|---|
| 4,034,084 | 7/1977 | Siragusa | 424/180 |
| 4,396,512 | * 8/1983 | Beauman et al. | |
| 4,587,213 | * 5/1986 | Malecki | |
| 4,603,006 | 7/1986 | Sikes et al. | 252/180 |
| 4,707,263 | 11/1987 | Nishimori et al. | 210/484 |
| 4,781,897 | 11/1988 | Geron et al. | 422/265 |
| 5,051,189 | * 9/1991 | Farrah | |
| 5,222,595 | 6/1993 | Gouge et al. | |
| 5,283,060 | 2/1994 | Shieh | |

FOREIGN PATENT DOCUMENTS

| | | |
|---|---|---|
| 4216571 | 11/1993 | (DE) . |
| 0 496 905 | 8/1992 | (EP) . |
| 0 536 087 A1 | 9/1992 | (EP) . |
| 90058392B | 12/1990 | (JP) . |
| 06279204A | 3/1993 | (JP) . |
| 5345701A | 12/1993 | (JP) . |
| 1032067 | 7/1983 | (RU) . |
| 92/16461 | 10/1992 | (WO) . |

OTHER PUBLICATIONS

Ackart, et al., Antimicrobial Polymers, 1975, vol., 9 pp. 55–68, J. Biomed. Mater. Res.

GJL Griffin, Chemistry and Technology of Biodegradable Polymers, 1994, Blackie Academic & Professional, London UX, paragraph 2.3.2.

* cited by examiner

Primary Examiner—Leon B. Lankford, Jr.

(57) ABSTRACT

A method for inhibiting the growth of microorganisms in an aqueous medium comprises contacting the aqueous medium with a permeable body comprising material which interacts with the microorganisms. Such interaction involves a change in the chemical structure of the material resulting from the action of one or more of the microorganisms. The permeable body may take the form of a permeable bag containing plant fibers and may be used for the treatment of photoprocessor wash waters.

11 Claims, 3 Drawing Sheets

METHOD FOR INHIBITING THE GROWTH OF MICROORGANISMS IN AN AQUEOUS MEDIUM

FIELD OF THE INVENTION

The invention relates to a method for inhibiting the growth of microorganisms in an aqueous medium.

BACKGROUND OF THE INVENTION

Microbial growth occurs in many systems in which aqueous media such as water, aqueous solutions and aqueous dispersions of material are employed.

For example, there is a significant biofouling problem in many areas of photoprocessing and other systems, in particular where low flowrate washes and water recycling is employed. Biofouling is a complex process which causes microorganisms e.g. bacteria to attach to surfaces and can occur over a wide range of bacterial levels. This may be due to a diffusion controlled process or the lack of food in solution encouraging the bacteria to attach to surfaces.

Biocides have been used for many years to control biogrowth but have several drawbacks. First, they are by nature fairly toxic chemicals and thus present handling and containment problems. Secondly, addition of biocides is not often controlled carefully and they can be added when not needed which is costly and potentially harmful to the environment. Thirdly, microorganisms can become resistant to a particular biocide which necessitates switching biocides at regular intervals. Fourthly, legislation on discharges to drains is becoming more stringent in many countries such that the levels of biocide disposal may become an issue preventing their conventional use. Finally, there is no universal treatment to kill or control all types of bacteria and fungi. Hence, the prior art is limited to these relatively toxic chemicals, chlorination, UV, ozonolysis and gamma radiation.

EP-A-0 536 087 describes a resevoir system for the prolonged and even release of soluble active materials into water or an aqueous medium which comprises a nonwoven fabric bag containing the active material e.g. an antifungal agent. The nonwoven material is made from continuous monofilaments or microfibres of a synthetic thermoplastic polymer which has been treated to give it the required degree of permeability.

PROBLEM TO BE SOLVED BY THE INVENTION

A method for inhibiting the growth of microorganisms in an aqueous medium is required which does not involve the use of toxic chemicals or radiation.

SUMMARY OF THE INVENTION

The invention provides a method for inhibiting the growth of microorganisms in an aqueous medium comprising contacting the aqueous medium with a permeable body comprising a material which interacts with the microorganisms characterised in that the material undergoes a change in its chemical structure resulting from the action of one or more of the microorganisms.

ADVANTAGEOUS EFFECT OF THE INVENTION

The invention provides a passive way of solving the problem of biofouling of surfaces. There is no dosing of toxic chemicals into the water.

As the microorganisms are attracted to the permeable body, biofouling of other components can be reduced.

The method is simple and, unlike methods employing filters or columns, does not depend on water flowrate or pressure. Also, there are none of the blockage problems associated with the use of filters and columns.

The permeable body used in the invention can be easily inserted and retrieved from the aqueous medium.

DETAILED DESCRIPTION OF THE INVENTION

Figure 1:
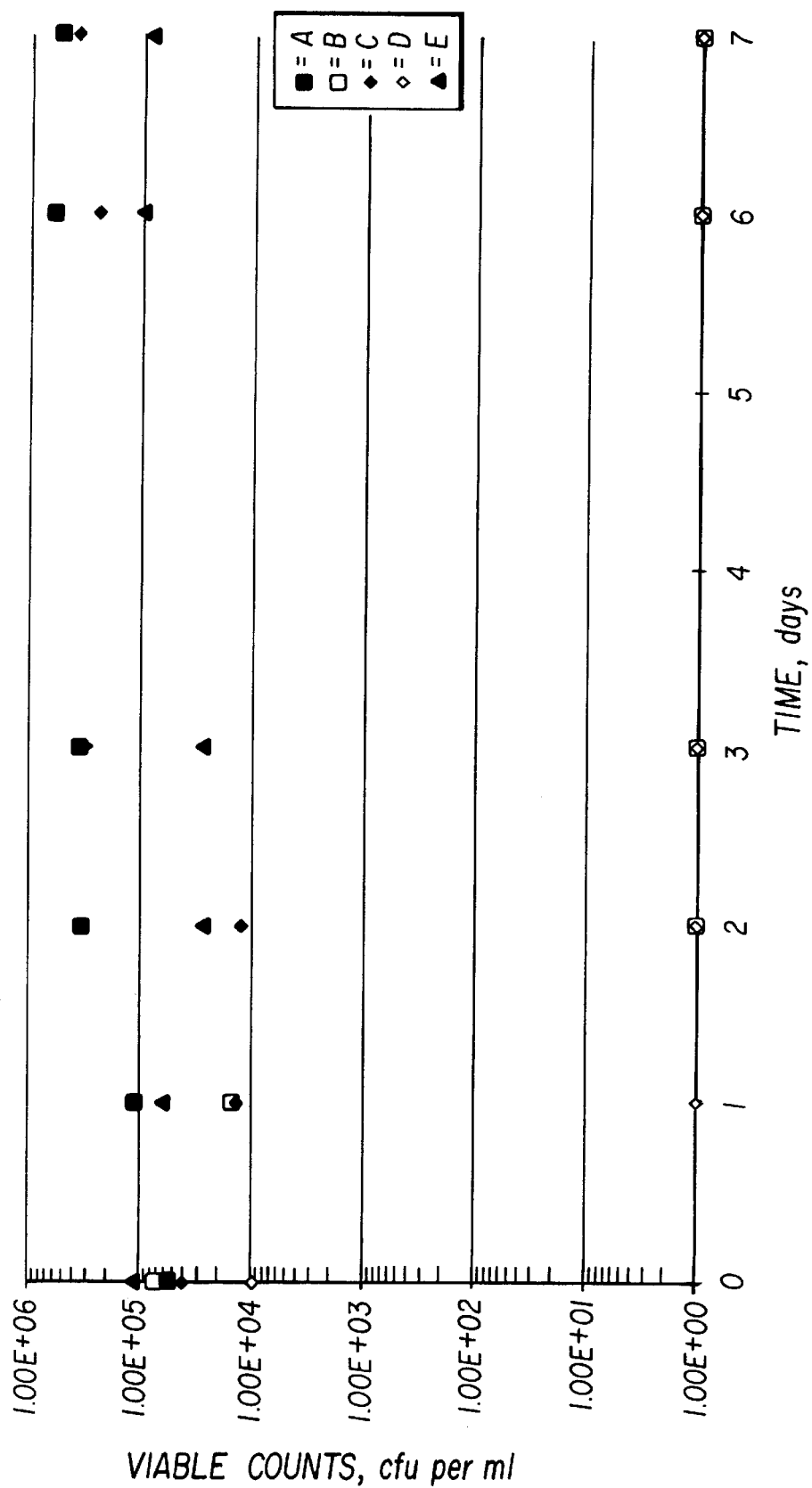
FIG. 1 is a graph showing viable planktonic bacterial counts as a function of time in accordance with the results obtained in Example 1 below.

The method of the invention inhibits the growth of microorganisms in an aqueous medium. Microorganisms include bacteria, yeasts, fungi and algae. Such microorganisms are particularly found in low nutrient aqueous environments such as the wash water baths of photoprocessors.

The permeable body comprises biodegradable material i.e. material capable of being degraded by one or more of the microorganisms in the aqueous medium. Preferably, the biodegradation rate is relatively slow, e.g. having a half life from 4 weeks to 6 months, as discussed in *Chemistry and Technology of Biodegradable Polymers,* Edited by G J L Griffin, published by Blackie Academic & Professional, 1994.

Preferably, the material has an affinity for the microorganisms such that the microorganisms are attracted by and adhere to the material. Preferably, the material is hydrophobic.

Preferably, the material is substantially free of soluble material capable of dissolving in the aqueous medium.

Preferably, the material has a density less than the aqueous medium in which it is used.

Preferably, the material is in a form providing a high surface area e.g. fibrous, or particulate such as beads, granules. The size of the material is such that it is retained within the permeable container.

Suitable biodegradable materials are described in the art e.g. *Chemistry and Technology of Biodegradable Polymers,* Edited by G J L Griffin, published by Blackie Academic & Professional, 1994. Examples of suitable materials include any oligomeric or polymeric materials containing carbon, hydrogen and, optionally, oxygen, nitrogen and sulphur. Specific examples of preferred materials include cellulose and its derivatives e.g. plant fibres.

The permeable body may take any form which can be easily inserted and retrieved from the aqueous medium. The body is such that it remains intact both in and out of the aqueous medium.

Examples of forms the permeable body can take include a woven or non-woven fibrous body, a body of particulate material in which the particles are adhered together, aggregations of high surface area materials e.g. bundles of fibres or tubes, and multilayered or convoluted sheets.

The material may be attached to a support.

In a preferred embodiment the permeable body comprises a permeable container containing the material. The size of the material is such that it is retained within the permeable container. In this format, the material may be in the form of loose fibres or particles.

The permeable container may be made of any material provided that it does not adversely affect the inhibition of the growth of microorganisms by the material contained therein.

Preferably, the container material is insoluble in the aqueous medium.

Preferably, the container material has a density less than the aqueous medium in which it is used.

Preferred materials from which the container may be made include polymers e.g. a polyamide such as Nylon, a polyolefin such as polypropylene, a polyester such as a polyacrylate. Other suitable materials include metals e.g. stainless steel, inorganic oxides e.g. silica, inorganic-organic composites e.g. organically modified silicates.

The container must be permeable. Preferably, the container is made from woven fibrous polymeric material. Alternatively, it may be made from the material in a different porous form.

Preferably, the size of the pores or openings in the container is at least 0.5 micron, more preferably at least 5 microns to allow the microorganisms to enter the container.

The container may take any form e.g. a box, cylinder, sphere or any three dimensional shape. Preferably, the container is in the form of a bag made of flexible material e.g. a woven material. For example, a suitable bag may be made from two adjacent sheets of material sealed around the edge(s). In a preferred embodiment sheets of woven polymeric fibres are used.

The size of the container may vary depending on the purpose for which it is used. For example, for treating water in small tanks, the container may be of such a size as to provide a surface area of 100 cm$^2$. Much larger surface areas could be employed.

Preferably, a number of small containers are used rather than a single large container.

Preferably, both the material from which the container is made and the biodegradable material within the container have a density less than the aqueous medium in which they are used so that the container floats on the surface of the medium. This is a preferred location because microorganisms have a tendency to accumulate at the air-water interface.

Alternatively, the container and contents may have a density greater than that of the aqueous medium and be suspended in the medium.

The method of the invention may be used in any aqueous system subject to contamination by microorganisms. Typical systems include wash waters used in industrial processes e.g. in food processing, paper making, textile production, laundry and photoprocessing. Other applications include water cooling, oil/water systems and water purification where microorganisms need to be killed or where their growth needs to be controlled.

A preferred application is the treatment of photoprocessing solutions in photoprocessing apparatus e.g. wash water, stabiliser solution, bleach solution, fixer solution, bleach/fix solution, and other aqueous industrial streams such as cooling waters.

The method of the invention involves contacting the aqueous medium with the permeable body of material and leaving the body in the medium for a period of time sufficient to inhibit the growth of microorganisms. The period of time may vary considerably, e.g. from 8 hours to 6 months, preferably from 3 days to 30 days. The permeable body can be removed when required and may be replaced.

The invention is further illustrated by way of example as follows.

EXAMPLE 1

An experiment was performed using bags containing several different kinds of fibres constructed to give a wide range of performances in the control of bacterial populations in aqueous media. Woven polypropylene bags containing biodegradable plant fibres (B) (Oilsorb supplied by Wessex), non-biodegradable polypropylene fibres (C) and non-biodegradable polypropylene fibres plus adsorbed biocide (D) were used. Nylon mesh bags containing granular polyester material (E) were used also. Two bags of each were placed in separate conical flasks, to serve as duplicates, containing 50 ml of water and an aliquot of *Pseudomonas aeruginosa* (a microorganism commonly found in the wash water of photoprocessing apparatus) was added to give an initial bacterial level of ~$10^5$ colony forming units (cfu)/ml. These flasks plus ional controls (A) without any bags, were incubated at 30° C. for 1 week. Samples were taken from the aqueous media after 1,2,3,6 and 7 days and the number of viable planktonic bacteria determined by plating onto nutrient agar using serial dilutions and visual counting of the colonies employed to give the results presented in Table 1.

TABLE 1

| TIME, days | A | B | C | D | E |
|---|---|---|---|---|---|
| 0 | 5.25E + 05 | 7.25E + 05 | 4.08E + 05 | 9.49E + 04 | 1.12E + 06 |
| 1 | 1.11E + 06 | 1.47E + 05 | 1.35E + 05 | 1.00E + 01 | 6.17E + 05 |
| 2 | 3.35E + 06 | 1.00E + 01 | 1.22E + 05 | 1.00E + 01 | 2.75E + 05 |
| 3 | 3.42E + 06 | 1.00E + 01 | 3.08E + 06 | 1.00E + 01 | 2.75E + 05 |
| 6 | 6.25E + 06 | 1.00E + 01 | 2.47E + 06 | 1.00E + 01 | 9.75E + 05 |
| 7 | 5.33E + 06 | 1.00E + 01 | 3.92E + 06 | 1.00E + 01 | 8.58E + 05 |

The results are plotted in FIG. 1, it can be seen that the bacterial population in the control increased only slightly over 7 days due to the lack of nutrient in the water. A similar pattern is observed for the non-biodegradable polypropylene and polyester fibre bags. Not surprisingly, the "active" bags containing adsorbed biocide reduced the bacterial count below detection limits (~16 cfu/ml) within the first day. It is worth mentioning that the biocide would probably have desorbed upon contact with water, i.e. not an example of slow release technology mentioned in the previous section, but a high initial dose method.

However, the bags containing biodegradable plant fibres also gave significant reductions in the planktonic bacterial population such that after 2 days the counts were below the detectable limits. This result is unexpected, since biodegradable materials could provide nutrients for the bacteria and hence the bacterial population might have been expected to increase. This result demonstrates a way to control a planktonic bacterial population without the need to use any chemical biocides or other common treatments.

EXAMPLE 2

Another experiment using the same procedures as Example 1 was carried out over 15 days to ascertain whether the bacterial population would increase during a longer time period. The experimental procedure of Example 1 was used and a commercial biocide-releasing bag made by Rohm and Haas (Kathon MWX, an isothiazolinone, used for biogrowth control in metal-working solutions) was included for comparison (F). In addition, the non-biodegradable polypropylene fibres were not analysed but replaced by some non-biodegradable polyester fibres (C) inside a nylon mesh bag. The results are presented in Table 2.

TABLE 2

| TIME, days | A | B | C | D | E | F |
|---|---|---|---|---|---|---|
| 0 | 5.00E+05 | 3.67E+05 | 1.06E+05 | 3.33E+05 | 5.75E+05 | 7.83E+05 |
| 1 | 1.58E+05 | 2.67E+05 | 5.00E+02 | 1.00E+01 | 2.83E+04 | 1.00E+01 |
| 2 | 3.75E+04 | 5.00E+02 | 3.49E+03 | 1.00E+01 | 1.67E+03 | 1.00E+01 |
| 5 | 1.00E+04 | 1.00E+01 | 2.33E+04 | 1.00E+01 | 4.50E+05 | 1.00E+01 |
| 7 | 9.99E+05 | 1.00E+01 | 1.42E+05 | 1.00E+01 | 1.17E+07 | 1.00E+01 |
| 9 | 9.75E+05 | 1.00E+01 | 6.08E+04 | 1.00E+01 | 1.67E+07 | 1.00E+01 |
| 12 | 9.99E+05 | 1.00E+01 | 1.93E+05 | 1.00E+01 | 2.58E+07 | 1.00E+01 |
| 15 | 1.25E+06 | 1.00E+01 | 1.17E+05 | 1.00E+01 | 2.33E+08 | 1.00E+01 |

Figure 2:
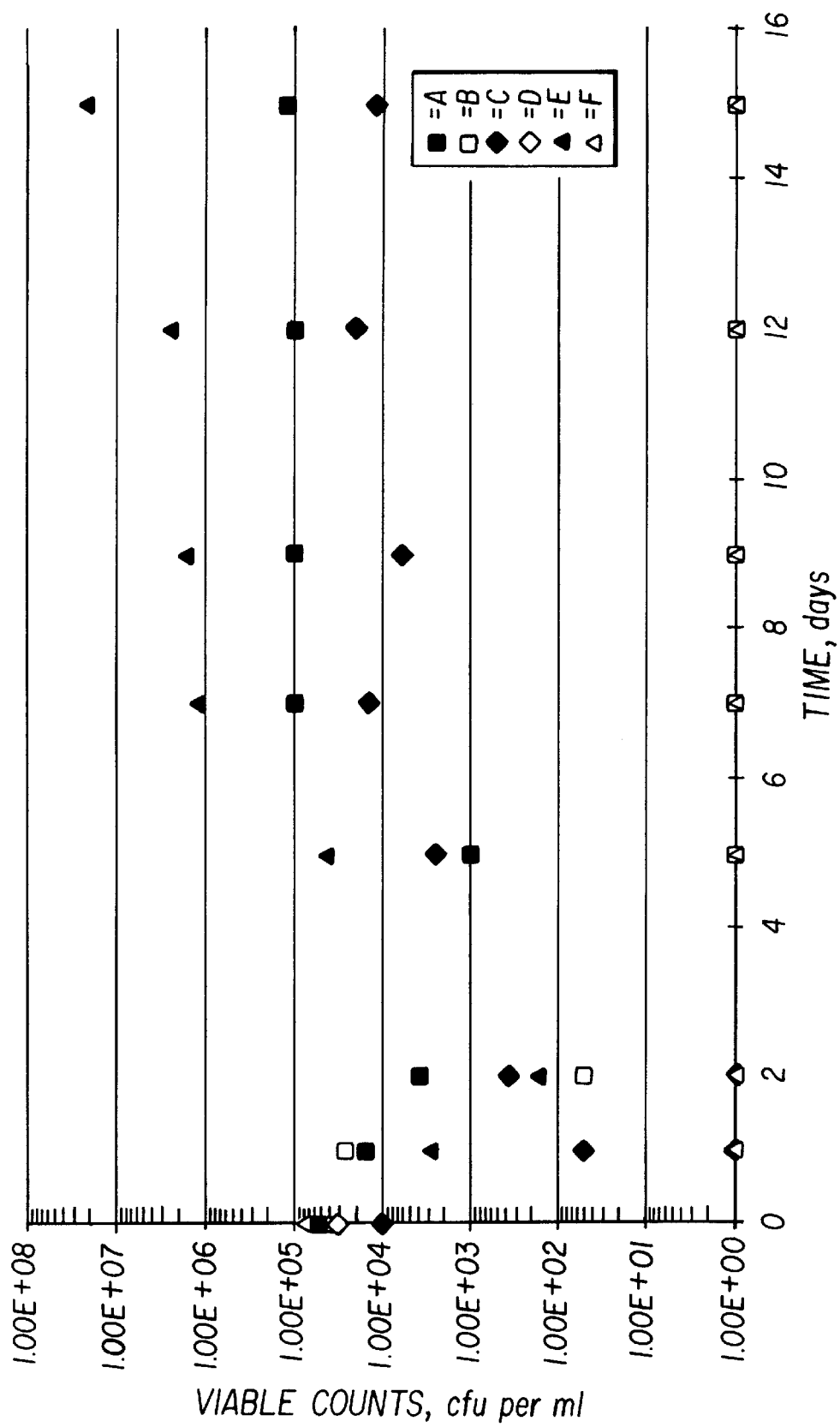
FIG. 2 is a graph showing viable planktonic bacterial counts as a function of time in accordance with the results obtained in Example 2 below.

The results are plotted in FIG. 2 where it can be seen that the "active" bags containing biocide adsorbed to polypropylene fibres and the commercially available bag reduce the planktonic population below the detectable limit within the first day. It is worth noting that, once killed there is no replenishment of bacteria in this experiment so the bacterial population would not be expected to rise. As found in Example 1, the control and polyester granule filled bag gave no such control of the bacterial population nor did they provide a growth medium although there is a rise to ~$10^7$ cfu/ml between day 12 and day 15. However, the polyester fibre filled bags did not appear to affect the planktonic bacterial population. The control of the bacterial population was achieved with the biodegradable fibre filled bags after 5 days and the level remained less than 16 cfu/ml throughout the remaining time period. Hence, these results confirm those found in Example 1. It can be concluded that a planktonic bacterial population in water can be reduced significantly over a long time period using a material in contact with the water which is biodegradable to some extent.

It is believed that this novel idea works due to the migration of the planktonic bacteria to the surface of the biodegradable material where they become sessile. The invention can be used to keep the bacterial concentrations low enough in the water tanks of photoprocessors such that bacterial biofilms do not form on components of the photoprocessors due to the "sacrificial" nature of the filled bags present. After fixed time intervals, chosen to coincide with routine maintenance schedules, the bags could be replaced.

EXAMPLE 3

A further experiment was performed using the same procedure as Examples 1 and 2. It was carried out over 38 days to determine whether the bags could maintain the bacterial population when repeat inoculums of *Pseudomonas aeruginosa* were added every 3 to 4 days. A range of materials were tested; biodegradable plant fibres (B), biodegradable plant fibres with absorbed biocide (Bactiguard, an isothiazolinone) (C), Biopol (a polyhydroxybutyrate-polyhydroxyvalerate coplolymer supplied by Zeneca) in nylon mesh bags (D), Bioceta (a biodegradable polymer supplied by Rhone Poulenc (T1807 6V30S) in nylon mesh bags (E) and non-biodegradable polypropylene fibres (F).

The results are presented in Table 3.

TABLE 3

| TIME, days | A | B | C | D | E | F |
|---|---|---|---|---|---|---|
| 0 | 4.01E+06 | 8.24E+06 | 6.17E+06 | 2.25E+07 | 6.50E+06 | 4.92E+06 |
| 1 | 3.17E+06 | 1.67E+03 | 1.00E+01 | 1.08E+07 | 2.42E+06 | 9.48E+03 |
| 2 | 6.67E+06 | 7.42E+06 | 1.00E+01 | 7.42E+06 | 1.48E+05 | 5.92E+04 |
| 3 | 6.83E+06 | 1.00E+01 | 1.00E+01 | 9.90E+06 | 9.75E+03 | 7.08E+04 |
| 6 | 6.25E+06 | 1.00E+01 | 1.00E+01 | 1.25E+07 | 1.00E+01 | 3.72E+04 |
| 8 | 1.25E+07 | 1.00E+01 | 1.00E+01 | 3,34E+07 | 1.00E+01 | 3.12E+04 |
| 14 | 1.99E+07 | 1.00E+01 | 1.00E+01 | 4.84E+07 | 1.00E+01 | 1.35E+04 |
| 15 | 1.98E+07 | 1.00E+01 | 1.00E+01 | 5.92E+07 | 1.00E+01 | 3.00E+05 |
| 17 | 2.88E+07 | 1.00E+01 | 1.00E+01 | 4.00E+07 | 1.00E+01 | 2.34E+04 |
| 20 | 4.17E+07 | 1.00E+01 | 1.00E+01 | 4.75E+07 | 1.00E+01 | 1.74E+04 |
| 22 | 5.17E+07 | 1.00E+01 | 1.00E+01 | 3.00E+07 | 1.00E+01 | 3.58E+04 |
| 24 | 3.67E+07 | 1.00E+01 | 1.00E+01 | 1.03E+07 | 1.00E+01 | 2.09E+04 |
| 27 | 5.83E+07 | 1.00E+01 | 1.00E+01 | 4.00E+07 | 1.00E+01 | 2.01E+04 |
| 29 | 5.09E+07 | 1.00E+01 | 1.00E+01 | 2.50E+07 | 1.00E+01 | 4.17E+04 |
| 31 | 4.59E+07 | 1.00E+01 | 1.00E+01 | 4.75E+07 | 1.00E+01 | 5.17E+04 |
| 35 | 1.09E+08 | 1.00E+01 | 1.00E+01 | 3.33E+07 | 1.00E+01 | 6.96E+04 |
| 36 | 4.84E+07 | 1.00E+01 | 1.00E+01 | 4.00E+07 | 1.00E+01 | 3.60E+04 |
| 38 | 1.19E+08 | 1.00E+01 | 1.00E+01 | 1.27E+08 | 1.00E+01 | 1.38E+05 |

Figure 3:
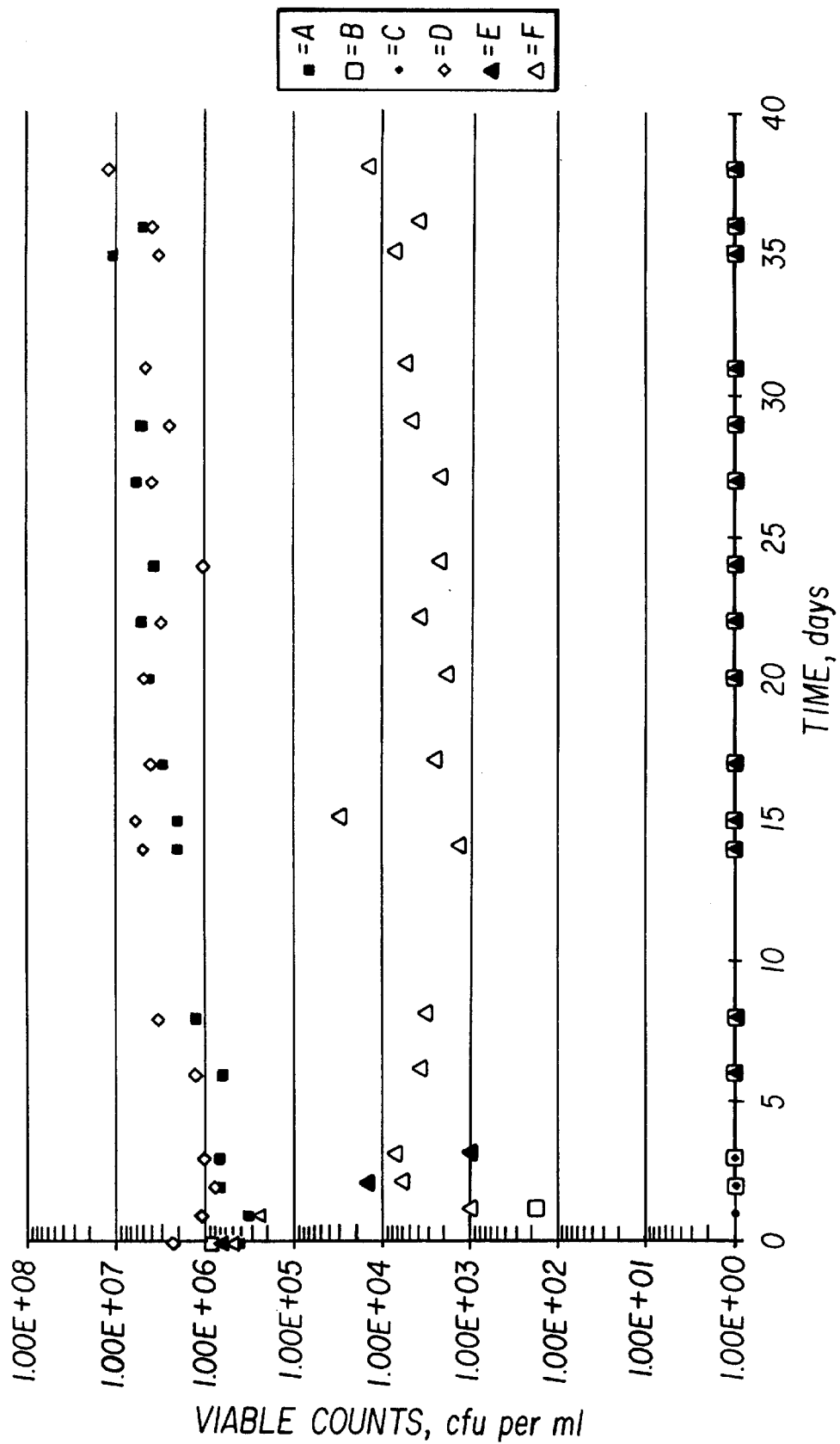
FIG. 3 is a graph showing viable planktonic bacterial counts as a function of time in accordance with the results obtained in Example 3 below.

The results are plotted in FIG. 3 where it can be seen that the control bacterial population (A) shows very little increase during the 38 days due to the lack of nutrient. The biodegradable plant fibres with absorbed biocide (C) have a biocidal action within the first day, reducing the bacterial population below the detectable limits by the quick release of a large amount of biocide. The biodegradable plant fibres (B) and the Bioceta bags (E) also reduce the number of viable planktonic bacteria to below the detectable limits but at 2 days and 6 days respectively. The Biopol bags (D) have no affect on the bacterial population with the counts remaining constant throughout the experiment. The polypropylene bags (F), which are neither biodegradable nor contain biocide, maintained the bacterial population between $10^3$ and $10^4$ cfu/ml throughout the experiment even under rechallenge.

In all cases where the planktonic bacterial population was controlled the rechallenging of the system with more bacteria did not bring about failure of this method of biogrowth control.

In conclusion this system could be used to limit biofilm formation in a photoprocessor by acting as a "sacrificial" surface and would remain "active" even under severe rechallenge.

What is claimed is:

1. A method for decontaminating an aqueous medium without the use of biocides comprising placing in said medium a container which contains a biodegradable water permeable material wherein said container is permeable to water and wherein said water permeable material attracts, adheres and is biodegraded by said microorganisms;

wherein said container is left in the medium for at least a time sufficient for said microorganisms to be attracted by and adhered to said biodegradable water permeable material.

2. A method according to claim 1 wherein the material is hydrophobic.

3. A method according to claim 1 wherein the material has a density less than the aqueous medium in which it is used.

4. A method according to claim 1 wherein the material is in fibrous or particulate form.

5. A method according to claim 1 wherein the material is cellulose or a cellulose derivative.

6. A method according to claim 1 wherein the container is made of a polymeric material.

7. A method according to claim 1 wherein the container is made of a woven fibrous material.

8. A method according to claim 1 wherein said container is in the form of a bag.

9. A method according to claim 1 wherein the container is made from a material having a density less than the aqueous medium in which it is used.

10. A method according to claim 1 wherein the medium is a photoprocessing solution.

11. A method according to claim 1 wherein the period of time varies from 8 hours to 6 months.

* * * * *